United States Patent
Sawada

(10) Patent No.: US 11,922,966 B2
(45) Date of Patent: Mar. 5, 2024

(54) SIGNAL SEPARATION APPARATUS, SIGNAL SEPARATION METHOD AND PROGRAM

(71) Applicant: NIPPON TELEGRAPH AND TELEPHONE CORPORATION, Tokyo (JP)

(72) Inventor: Hiroshi Sawada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 446 days.

(21) Appl. No.: 17/276,256

(22) PCT Filed: Oct. 1, 2019

(86) PCT No.: PCT/JP2019/038714
§ 371 (c)(1),
(2) Date: Mar. 15, 2021

(87) PCT Pub. No.: WO2020/071351
PCT Pub. Date: Apr. 9, 2020

(65) Prior Publication Data
US 2022/0028408 A1    Jan. 27, 2022

(30) Foreign Application Priority Data
Oct. 3, 2018   (JP) ................................. 2018-188392

(51) Int. Cl.
*G10L 21/028*     (2013.01)
*G06F 17/16*      (2006.01)
(Continued)

(52) U.S. Cl.
CPC .......... *G10L 21/0308* (2013.01); *G06F 17/16* (2013.01); *G10L 19/038* (2013.01); *G10L 21/028* (2013.01)

(58) Field of Classification Search
CPC ........................... G10L 21/028; G10L 19/038
See application file for complete search history.

(56) References Cited

U.S. PATENT DOCUMENTS

| | | | | |
|---|---|---|---|---|
| 4,791,654 A * | 12/1988 | De Marca | ............. | G10L 19/038 704/E19.017 |
| 2010/0174389 A1* | 7/2010 | Blouet | .................. | G10L 21/028 706/52 |

FOREIGN PATENT DOCUMENTS

CN          103124245 A  *  5/2013

OTHER PUBLICATIONS

D. Kitamura, "Determined Blind Source Separation Unifying Independent Vector Analysis and Nonnegative Matrix Factorization," IEEE/ACM TRANS. ASLP, 2016. (Year: 2016).*

(Continued)

*Primary Examiner* — Feng-Tzer Tzeng
(74) *Attorney, Agent, or Firm* — IPUSA, PLLC

(57) ABSTRACT

A signal separation device for acquiring a source signal from a mixed signal observed by a plurality of sensors includes: a database that stores feature information of a clean signal; separation matrix calculation means for repeatedly performing processes of, based on a separated signal obtained by multiplication of a mixed signal converted into a time-frequency representation by a separation matrix and on the feature information stored in the database, calculating a parameter to be used for an objective function for optimizing the separation matrix, and calculating a separation matrix for minimizing the objective function using the parameter; and output means for outputting a separated signal calculated using the optimized separation matrix obtained by the separation matrix calculation means.

5 Claims, 3 Drawing Sheets

(51) Int. Cl.
*G10L 21/0308* (2013.01)
*G10L 19/038* (2013.01)

(56) References Cited

OTHER PUBLICATIONS

Kim, "Real-Time Independent Vector Analysis for Convolutive Blind Source Separation," IEEE Transactions on Circuits and Systems, Jul. 2010. (Year: 2010).*

Kitamura, et al . . . "Determined Blind Source Separation Unifying Independent Vector Analysis and Nonnegative Matrix Factorization," IEEE/ACM TRANS. ASLP, 2016. (Year: 2016).*

Daichi Kitamura, et al. "Determined Blind Source separation Unifying Independent Vector Analysis and Nonnegative Matrix Factorization." IEEE/ACM Transactions on Audio, Speech and Language Processing (TASLP) 24.9 (Sep. 2016): 1626-1641.

* cited by examiner

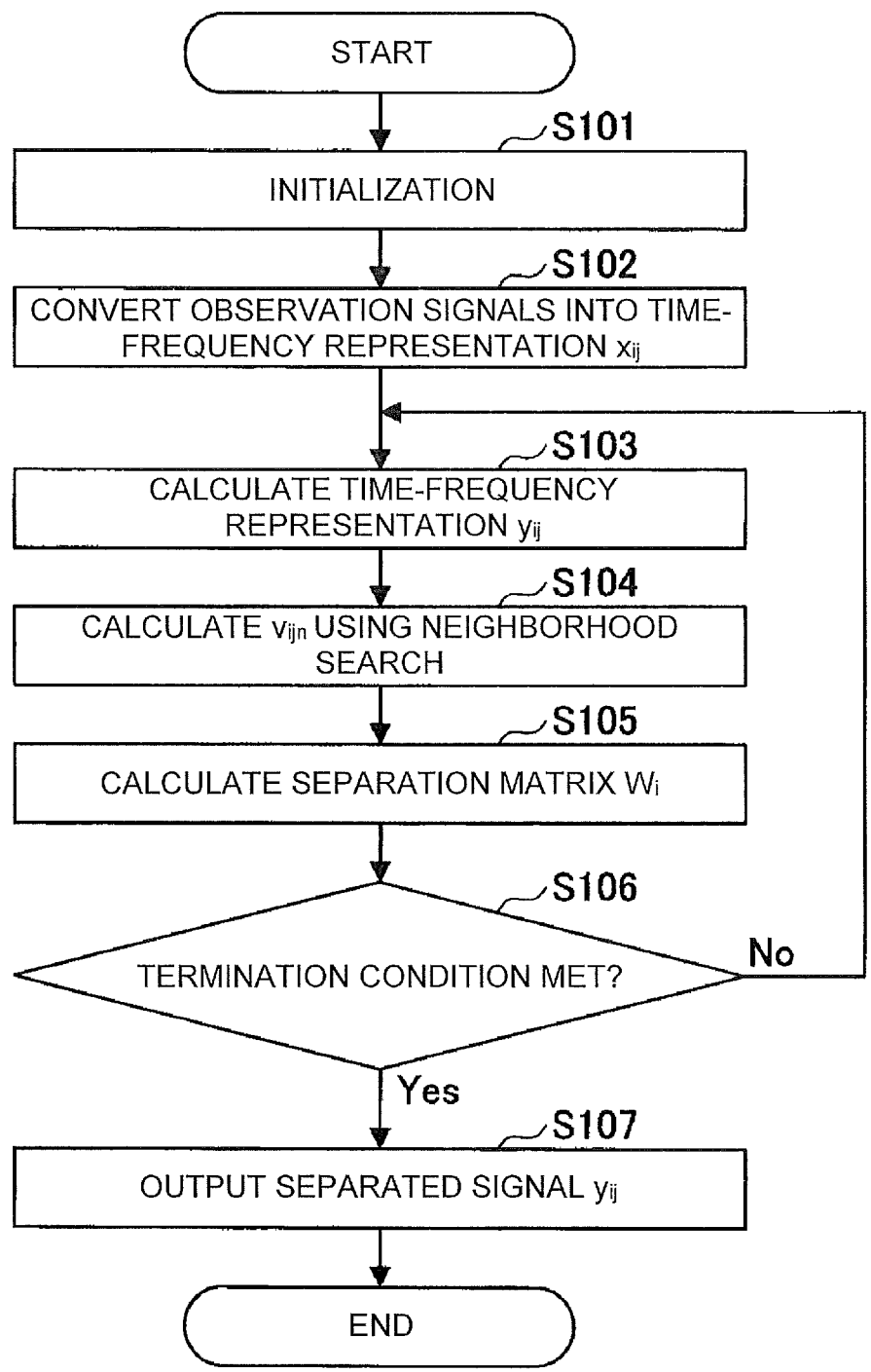

SIGNAL SEPARATION APPARATUS, SIGNAL SEPARATION METHOD AND PROGRAM

TECHNICAL FIELD

The present invention resides in the technical field of signal processing. In particular, the present invention relates to a blind signal separation technique for accurately extracting an intended source signal from a mixed signal observed by a plurality of sensors under a condition that there is no information on how the source signal has been mixed. The type of the signal does not specifically matter, and may be, for example, voice, a radio signal and others.

BACKGROUND ART

First, a conventional signal separation method will be described.

$j=1, \ldots, J$ denotes a discrete time and $i=1, \ldots, I$ denotes a discrete frequency. It is assumed that observation signals $x_{ij}m$, $m=1, \ldots, M$, are obtained by M sensors at each time and frequency (i, j). The M observation signals are collectively represented by a vector representation $x_{ij}=[x_{ij1}, \ldots, x_{ijM}]^T$. An object of signal separation is to obtain an N×M separation matrix $W_i$ for each frequency i from observation signals only and calculate a separated signal $y_{ijn}=[y_{ij}]_n$, $n=1, \ldots, N$, that is as nearer to a source signal as possible according to the following expression:

$$y_{ij} = W_i x_{ij} \quad (1)$$

If it is assumed that a separated signal $y_{ijn}$ is distributed in a time-varying complex Gaussian distribution, a probability density function is as follows:

[Formula 1]

$$p(y_{ijn}) = \frac{1}{\pi v_{ijn}} \exp\left(-\frac{|y_{ijn}|^2}{v_{ijn}}\right), \quad (2)$$

and a method in which the following negative log likelihood

[Formula 2]

$$C(\{W_i\}_{i=1}^{I}, \{v_{ijn}\}) = \sum_{i=1}^{I}\sum_{j=1}^{J}\left[\sum_{n=1}^{N}\left(\frac{|y_{ijn}|^2}{v_{ijn}} + \log v_{ijn}\right) - 2\log|\det W_i|\right] \quad (3)$$

is used as an objective function and a separation matrix is obtained for minimization of the objective function has been known. However, the method using a variance $v_{ijn}$ as a parameter for each of the times j, the frequencies i and the signals n has an overly high degree of flexibility, and the order of separated signals may be shuffled at each frequency. In other words, what is called a permutation problem may occur.

As a conventional method for solving that problem, independent vector analysis (IVA) based on time-varying Gaussian distribution has been known. Here, as indicated in an expression (4) below, it is assumed that a variance parameter $v_{jn}$ depends on a time j and a signal n only and does not depend on a frequency i.

[Formula 3]

$$C(\{W_i\}_{i=1}^{I}, \{v_{jn}\}) = \sum_{i=1}^{I}\sum_{j=1}^{J}\left[\sum_{n=1}^{N}\left(\frac{|y_{ijn}|^2}{v_{jn}} + \log v_{jn}\right) - 2\log|\det W_i|\right] \quad (4)$$

In this conventional method, irrespective of the frequency, the variance parameter is the same, and thus, it is hard to consider the feature of the variance being large at low frequencies and the variance being small at high frequencies such as voice as being correctly reflected in the variance parameter.

Therefore, as indicated in an expression (5) below, independent low-rank matrix analysis (ILRMA) in which this variance is represented by a low-rank matrix has been proposed later (see Non-Patent Literature 1).

[Formula 4]

$$C(\{W_i\}_{i=1}^{I}, \{T_n, V_n\}_{n=1}^{N}) = \quad (5)$$

$$\sum_{i=1}^{I}\sum_{j=1}^{J}\left[\sum_{n=1}^{N}\left(\frac{|y_{ijn}|^2}{\sum_{k=1}^{K} t_{ikn}v_{jkn}} + \log\sum_{k=1}^{K} t_{ikn}v_{jkn}\right) - 2\log|\det W_i|\right]$$

Here, a low-rank matrix is estimated for each signal n, and each low-rank matrix has the element $\Sigma^{K}_{k=1} t_{ikn} v_{jkn}$ of the size of I×J, and K is a rank of the matrix.

CITATION LIST

Non-Patent Literature

Non-Patent Literature 1: Kitamura Daichi, et al. "Determined blind source separation unifying independent vector analysis and nonnegative matrix factorization." IEEE/ACM Transactions on Audio, Speech and Language Processing (TASLP) 24.9 (2016): 1622-1637.

SUMMARY OF THE INVENTION

Technical Problem

Independent vector analysis and independent low-rank matrix analysis are effective where there are observation signals of a sufficient length of time (for example, around six seconds or more); however, if the lengths of the observation signals are short, statistical information for each source signal cannot sufficiently be learned, resulting in failure of the analysis to effectively operate.

An object of the present invention, which has been made in view of the above, is to provide a technique that effectively achieves signal separation even for a short observation signal.

Means for Solving the Problem

The disclosed technique provides a signal separation device for acquiring a source signal from a mixed signal observed by a plurality of sensors, the device including: a database that stores feature information of a clean signal;

separation matrix calculation means for repeatedly performing processes of, based on a separated signal obtained by multiplication of a mixed signal converted into a time-frequency representation by a separation matrix and on the feature information stored in the database, calculating a parameter to be used for an objective function for optimizing the separation matrix, and calculating a separation matrix for minimizing the objective function using the parameter; and output means for outputting a separated signal calculated using the optimized separation matrix obtained by the separation matrix calculation means.

Effects of the Invention

The disclosed technique enables achieving signal separation even for a short observation signal of, for example, around 0.5 seconds to 1 second.

BRIEF DESCRIPTION OF DRAWINGS

FIG. 3 is a flowchart illustrating an operation procedure of the signal separation device.

DESCRIPTION OF EMBODIMENTS

An embodiment of the present invention will be described below with reference to the drawings. The below-described embodiment is a mere example and an embodiment to which the present invention is applied is not limited to the below embodiment. Also, the type of signal to be subjected to signal separation below is not specifically limited but may be any type of signal and may be, for example, a sound signal or a radio signal.

(Example Device Configuration)

Figure 1:
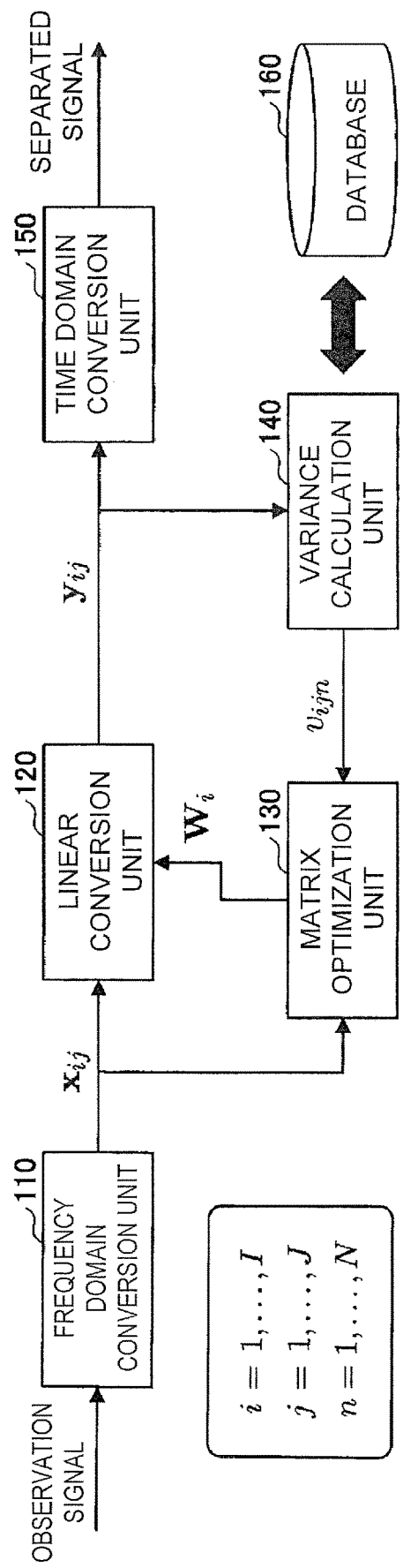
FIG. 1 is a functional configuration diagram of a signal separation device in an embodiment of the present invention.

FIG. 1 is a functional configuration diagram of a signal separation device 100 in an embodiment of the present invention. As illustrated in FIG. 1, the signal separation device 100 in the present embodiment includes a frequency domain conversion unit 110, a linear conversion unit 120, a matrix optimization unit 130, a variance calculation unit 140, a time domain conversion unit 150 and a database 160.

Note that the database 160 and the other functional units may be physically separated from each other and connected via a network. Also, the database 160 may be provided outside the signal separation device 100. Also, a part formed of the linear conversion unit 120, the matrix optimization unit 130 and the variance calculation unit 140 may be referred to as "separation matrix calculation means. Detailed operation, etc., of each of the functional units will be described later.

The signal separation device 100 can be implemented by executing a program for processing to be performed by the signal separation device 100, using a hardware resource such as a CPU or a memory incorporated in a computer. The program can be recorded on a computer-readable recording medium (e.g., a portable memory), and stored and distributed. Also, the program can be provided through a network such as the Internet or an e-mail.

Figure 2:
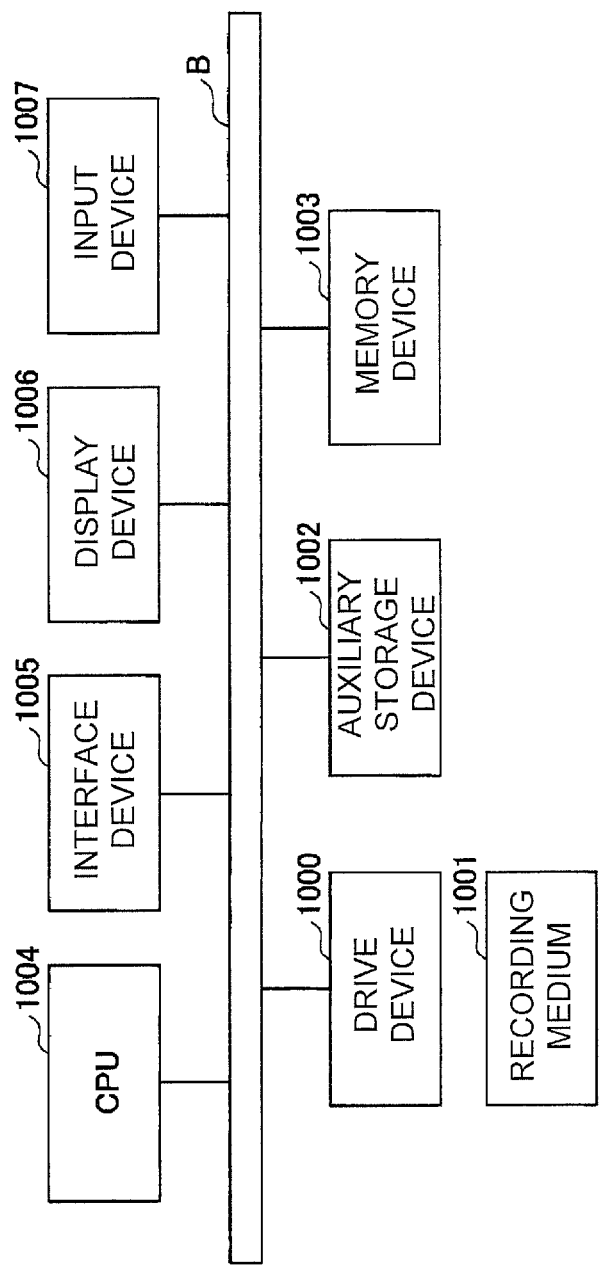
FIG. 2 is an example hardware configuration of the signal separation device.

FIG. 2 is a diagram illustrating an example hardware configuration of the computer. The computer in FIG. 2 includes, e.g., a drive device 1000, an auxiliary storage device 1002, a memory device 1003, a CPU 1004, an interface device 1005, a display device 1006 and an input device 1007 that are mutually connected via a bus B.

The program for implementing processing in the computer is provided by, for example, a recording medium 1001 such as a CD-ROM or a memory card. Upon the recording medium 1001 with the program stored thereon being set in the drive device 1000, the program is installed into the auxiliary storage device 1002 from the recording medium 1001 via the drive device 1000. However, the program does not necessarily need to be installed from the recording medium 1001 but may be downloaded from another computer via a network. The auxiliary storage device 1002 stores the installed program and also stores necessary files, data and the like.

When an instruction for stating the program is provided, the memory device 1003 reads the program from the auxiliary storage device 1002 and stores the program. The CPU 1004 implements a function relating to the signal separation device 100 according to the program stored in the memory device 1003. The interface device 1005 is used as an interface for connection to a network and functions as input means and output means for input and output via the network. The display device 1006 displays, e.g., a GUI (Graphical User Interface) according to the program. The display device 1006 is also an example of output means. The input device 1007 is formed of a keyboard and a mouse, buttons or a touch panel and is used for input of various operations and instructions.

Operation, etc., of the signal separation device 100 will be described in detail below.

(Database 160)

First, the database 160, which is a key point of the technique relating to the present invention, will be described. The database 160 is a large-scale database device including a database that represents features of source signals and stores feature information of unmixed clean signals. For example, for signal separation for voice, a large amount of clean voice features is stored in advance in the database 160.

In reality, a source signal to be separated in signal separation using the technique according to the present invention does not need to be included in the database 160 but another signal having a frequency feature that is similar to that of the source signal only needs to be included in the database 160.

It is assumed that there are L signals $l=1, \ldots, L$ to be stored in the database 160. A result of conversion of each of the signals into a time-frequency representation is represented by $s_{ijl}$. Also, $j=1, \ldots, J_l$ denotes a discrete time and $i=1, \ldots, I$ denotes a discrete frequency. This time-frequency representation is squared to obtain a power spectrum, and $$s_{jl} = [|s_{ij1}|^2, \ldots, |s_{Ijl}|^2]^T \qquad (6)$$

which is a vector representation obtained by collecting the power spectra of all the frequencies, is stored as an entry in the database 160. $\Sigma^L_{l=1} J_l$ such entries are stored in the database 160. In other words, the number of discrete times in each signal is $J_l$ and the total number of entries is $J_l \times L$.

In the signal separation device 100 minimizing a negative log likelihood represented by an expression (3), a variance $v_{ijn}$ is not set as a free parameter, but a proper one is selected from the $\Sigma^L_{l=1} J_l$ entries in the database 160 and set. In other words, the signal separation device 100 identifies an entry s* in the database 160, the entry s* being as nearest to the power spectrum $r_{jn} = [|y_{1jn}|^2, \ldots, |y_{Ijn}|^2]^T$ of a current separated signal as possible and sets an element of a vector of the entry s* set as a variance parameter. In other words, for example, $v_{ijn}=s_i^*$ is set.

Note that an increase of the number of entries in the database 160 along with an increase of an amount and/or a length of clean signals provides an advantage of enabling accurate estimation of a variance parameter; however, the problem of an increase in time of processing for identifying a nearest possible entry. In order to solve such problem, in the present embodiment, a high-speed similarity search technique is used.

(Operation of Signal Separation Device 100)

Operation of the signal separation device 100 having the configuration illustrated in FIG. 1 will be described according to the procedure of the flowchart illustrated in FIG. 3. The below described "S101" and the like indicate steps of the flowchart in FIG. 3. In the below description, $j=1, \ldots, J$ represents a discrete time and $i=1, \ldots, I$ represents a discrete frequency.

First, in S101, a matrix $W_i$, $i=1, \ldots, I$, shared by the linear conversion unit 120 and the matrix optimization unit 130 is initialized as a unit matrix.

Upon time-domain observation signals of M sensors being input to the signal separation device 100, in S102, the frequency domain conversion unit 110 converts each observation signal into a time-frequency representation $x_{ij}$, $i=1, \ldots, I$, $j=1, \ldots, J$ by means of short-time Fourier transform.

Subsequently, the below-described processing in S103 to S105 is repeated until a termination condition is met (until a result of determination in S106 becomes Yes). The termination condition is, for example, that the number of repetitions reaches a predetermined number or a value of $W_i$ converges (e.g., an amount of change of $W_i$ becomes equal or below a small value several times). Note that as described above, $W_i$ is a matrix of N×M.

In S103, the linear conversion unit 120 calculates a time-frequency representation y ij, $i=1, \ldots, I$, $j=1, \ldots, J$, according to the expression (1).

Subsequently, in S104, the variance calculation unit 140 performs a neighborhood search through the database 160 and calculates a variance parameter $v_{ijn}$ to be used for the expression (3) representing an objective function (negative log likelihood).

In S105, the matrix optimization unit 130 calculates a separation matrix $W_i$, $i=1, \ldots, I$, for minimizing the expression (3).

Upon determination in S106 becoming Yes after repetition of S103 to S105, in S107, the time domain conversion unit 150 performs inverse transform of short-time Fourier transform for $y_{ij}$ obtained from the optimized separation matrix $W_i$ and thereby outputs a time-domain separated signal (source signal). Note that the signal separation device 100 may output $y_{ij}$ itself, which has been obtained with $W_i$, for which a result of the determination in S106 becomes Yes, as a separated signal.

Details of the variance calculation unit 140 and the matrix optimization unit 130 will be described below.

[Variance Calculation Unit 140]

The variance calculation unit 140 performs the below processing for each signal n and each time j. In the present embodiment, a neighborhood search is performed using an Itakura-Saito divergence as a reference.

An Itakura-Saito divergence between two I-dimensional vectors, $r=[r_1, \ldots, r_I]^T$ and $s=[s_1, \ldots, s_I]^T$ is defined as

[Formula 5]

$$D_{IS}(r,s) = \sum_{i=1}^{I}\left(\frac{r_i}{s_i} - \log\frac{r_i}{s_i} - 1\right)$$

In consideration of a scale flexibility a, a vector s* of an entry in the database, the entry being a nearest neighbor of a power spectrum (vector) $r_{jn}$ of a current separated signal is searched for as $$s^* = \mathrm{argmin}_{j,l} D_{IS}(r_{jn}, \alpha s_{jl})$$

Note that α that minimizes $D_{IS}$ (r, αs) can be calculated by

[Formula 6]

$$\alpha = \frac{1}{I}\sum_{i=1}^{I}\frac{r_i}{s_i}$$

Then, a variance $v_{ijn}$ is set as $$v_{ijn} = \alpha[s^*]_i$$

$[s^*]_i$ is an element of a frequency i of the vector s*.

[Matrix Optimization Unit 130]

The matrix optimization unit 130 updates a matrix

[Formula 7]

$$W_i = \begin{bmatrix} w_{i1}^H \\ \vdots \\ w_{iN}^H \end{bmatrix} \quad (7)$$

for each frequency (mixed system) i according to the following procedure. First, a weighted average of a correlation matrix of an observation signal

[Formula 8]

$$U_{in} = \frac{1}{J}\sum_{j=1}^{J}\frac{1}{v_{ijn}}x_{ij}x_{ij}^T \quad (8)$$

is calculated for each of all signals $n=1, \ldots, N$. $W_i$ is updated as a matrix that subjects these N matrices $U_{in}$ to hybrid exact-approximate joint diagonalization (HEAD). As an example of such method, there is a method in which expressions (9) and (10) below are calculated. In other words,

[Formula 9]

$$W_{in} = (W_i U_{in})^{-1} e_n \quad (9)$$

is calculated (here, $e_n$ is a vector in which only an n-th element is 1 and the other elements are all 0) and a scale is normalized according to

[Formula 10]

$$w_{in} = \frac{w_{in}}{\sqrt{w_{in}^H U_{in} w_{in}}} \quad (10)$$

Note that other than the method using HEAD, which has been described in the present embodiment, optimization can be performed using gradient descent in which below differentiation relating to $W_i$ in the expression (3), which is an objective function,

[Formula 11]

$$\frac{\partial C}{\partial W_i^*} = \sum_{j=1}^{J} g_{ij} x_{ij}^H - J \cdot (W_i^H)^{-1}, \, g_{ij} = \left[\frac{y_{ij1}}{v_{ij1}}, \ldots, \frac{y_{ijN}}{v_{ijN}}\right]^T \quad (11)$$

or natural gradient using the expression (11) subjected to right multiplication of $W_i^H W_i$. Also, $W_i$ may be optimized using a method other than these methods.

Effects of Embodiment

The technique according to the present embodiment only requires identifying an entry in the database 160 for each discrete time for acquisition of a parameter $v_{ijn}$ to be used in an objective function and does not require leaning statistic information. Therefore, the technique according to the present embodiment enables effectively achieving signal separation even for a short observation signal of, for example, around 0.5 seconds to 1 second.

Summary of Embodiment

As described above, the present embodiment provides a signal separation device for acquiring a source signal from a mixed signal observed by a plurality of sensors, the device including: a database that stores feature information of a clean signal; separation matrix calculation means for repeatedly performing processes of, based on a separated signal obtained by multiplication of a mixed signal converted into a time-frequency representation by a separation matrix and on the feature information stored in the database, calculating a parameter to be used for an objective function for optimizing the separation matrix, and calculating a separation matrix for minimizing the objective function using the parameter; and output means for outputting a separated signal calculated using the optimized separation matrix obtained by the separation matrix calculation means.

The feature information stored in the database is, for example, a power spectrum for each discrete time of the clean signal.

The separation matrix calculation means identifies a power spectrum of the clean signal that is a nearest neighbor of a power spectrum of the separated signal for each discrete time by searching the database, and sets the parameter using an element of the identified power spectrum of the clean signal.

Although the present embodiment has been described above, the present invention is not limited to particular embodiments and various alterations and changes are possible within the scope of the spirit of the present invention stated in the claims.

REFERENCE SIGNS LIST 100 signal separation device
110 frequency domain conversion unit
120 linear conversion unit
130 matrix optimization unit
140 variance calculation unit
150 time domain conversion unit
160 database
1000 drive device
1001 recording medium
1002 auxiliary storage device
1003 memory device
1004 CPU
1005 interface device
1006 display device
1007 input device

The invention claimed is:

1. A signal separation device for acquiring a source signal from a mixed signal observed by a plurality of sensors, the device comprising:
    a database that stores feature information of a clean signal, said feature information being a power spectrum for each discrete time of the clean signal, said power spectrum being obtained by converting a signal for each discrete time of the clean signal to be stored in the database into a time-frequency representation and calculating a square of the time-frequency representation;
    a separation matrix calculator for repeatedly performing, until a termination condition is met, processes of, based on a separated signal obtained by multiplication of a mixed signal converted into a time-frequency representation by a separation matrix and on the feature information stored in the database, calculating a parameter to be used for an objective function representing a negative log likelihood for optimizing the separation matrix, and calculating a separation matrix for minimizing the objective function using the parameter, said termination condition being at least of one of a first condition that a number of repetition of the processes reaches a predetermined value, and a second condition that the separation matrix converges; and
    an outputter for outputting a separated signal calculated using the optimized separation matrix obtained by the separation matrix calculator.

2. The signal separation device according to claim 1, wherein the separation matrix calculator identifies a power spectrum of the clean signal that is a nearest neighbor of a power spectrum of the separated signal for each discrete time by searching the database, and sets the parameter using an element of the identified power spectrum of the clean signal.

3. A signal separation method that is executed by a signal separation device for acquiring a source signal from a mixed signal observed by a plurality of sensors,
    the signal separation device including a database that stores feature information of a clean signal, said feature information being a power spectrum for each discrete time of the clean signal, said power spectrum being obtained by converting a signal for each discrete time of the clean signal to be stored in the database into a time-frequency representation and calculating a square of the time-frequency representation, the method comprising:
    a separation matrix calculation step of repeatedly performing, until a termination condition is met, processes of, based on a separated signal obtained by multiplication of a mixed signal converted into a time-frequency representation by a separation matrix and on the feature information stored in the database, calculating a parameter to be used for an objective function representing a negative log likelihood for optimizing the separation matrix, and calculating a separation matrix for minimizing the objective function using the parameter, said termination condition being at least of one of a first condition that a number of repetition of the processes reaches a predetermined value, and a second condition that the separation matrix converges; and an output step of outputting a separated signal calculated using the optimized separation matrix obtained by a separation matrix calculator.

4. The signal separation method according to claim 3, wherein in the separation matrix calculation step, the signal separation device identifies a power spectrum of the clean signal that is a nearest neighbor of a power spectrum of the separated signal for each discrete time by searching the database, and sets the parameter using an element of the identified power spectrum of the clean signal.

5. A non-transitory computer-readable medium storing instructions which, when executed by a processing system including at least one processor, cause the processing system to perform operations, the operations comprising:

a separation matrix calculation step of repeatedly performing, until a termination condition is met, processes of, based on a separated signal obtained by multiplication of a mixed signal converted into a time-frequency representation by a separation matrix and on feature information of a clean signal stored in the database, said feature information being a power spectrum for each discrete time of the clean signal, said power spectrum being obtained by converting a signal for each discrete time of the clean signal to be stored in the database into a time-frequency representation and calculating a square of the time-frequency representation, calculating a parameter to be used for an objective function representing a negative log likelihood for optimizing the separation matrix, and calculating a separation matrix for minimizing the objective function using the parameter, said termination condition being at least of one of a first condition that a number of repetition of the processes reaches a predetermined value, and a second condition that the separation matrix converges; and an output step of outputting a separated signal calculated using the optimized separation matrix obtained by a separation matrix calculator.

* * * * *